US012789412B2

(12) United States Patent
Gross et al.

(10) Patent No.: US 12,789,412 B2
(45) Date of Patent: Nov. 10, 2026

(54) EXTRUDER COMPRISING A FILTER ELEMENT

(71) Applicant: FEDDEM GMBH & CO. KG, Sinzig (DE)

(72) Inventors: Dieter Gross, Pfungstadt (DE); David Constroffer, Bad Breisig (DE)

(73) Assignee: FEDDEM GmbH & Co. KG, Sinzig (DE)

( * ) Notice: Subject to any disclaimer, the term of this patent is extended or adjusted under 35 U.S.C. 154(b) by 75 days.

(21) Appl. No.: 18/837,468

(22) PCT Filed: Feb. 4, 2023

(86) PCT No.: PCT/EP2023/052747

§ 371 (c)(1),
(2) Date: Aug. 9, 2024

(87) PCT Pub. No.: WO2023/152058

PCT Pub. Date: Aug. 17, 2023

(65) Prior Publication Data

US 2025/0162230 A1 May 22, 2025

(30) Foreign Application Priority Data

Feb. 10, 2022 (EP) .................................... 22156128

(51) Int. Cl.
*B29B 7/84* (2006.01)
*B29C 48/25* (2019.01)
(Continued)

(52) U.S. Cl.
CPC ............ *B29B 7/84* (2013.01); *B29C 48/2545* (2019.02); *B29C 48/288* (2019.02);
(Continued)

(58) Field of Classification Search
CPC ........... B29B 7/84; B29B 7/845; B29B 7/847; B29C 48/2545; B29C 48/76–768
See application file for complete search history.

(56) References Cited

U.S. PATENT DOCUMENTS 4,578,455 A * 3/1986 Pipper ..................... B29B 7/845
264/102
7,607,817 B2 * 10/2009 Samann ................. B29B 7/421
366/85
(Continued)

FOREIGN PATENT DOCUMENTS

DE 1729395 B 12/1971
DE 3310676 9/1984
(Continued)

*Primary Examiner* — Atul P. Khare
(74) *Attorney, Agent, or Firm* — Thomas M. Freiburger

(57) ABSTRACT

The invention relates to an extruder for processing pulverulent bulk material, in which at least one housing portion, which accommodates a filter element (5) located on a support frame (4), is configured in a feed region. According to the invention, the filter element (5) is formed from interconnected layers of sintered metal wire mesh screens, the filter element (5) containing at least one protective layer (27) which is directed against the screw and has a mesh size of 20-100 μm, a filter layer (28) having a mesh size of <1 μm, and a rear support layer, and the protective layer (27) being located at a safety distance of 0.5-2 mm from the outer diameter of the screw. The filter element (5) can be removed from the housing portion with the aid of the support frame (4) and is self-supporting and dimensionally stable.

5 Claims, 4 Drawing Sheets

(51) Int. Cl.

| | |
|---|---|
| ***B29C 48/285*** | (2019.01) |
| ***B29C 48/76*** | (2019.01) |
| *B29B 7/58* | (2006.01) |
| *B29C 48/395* | (2019.01) |

(52) U.S. Cl.
CPC .............. *B29C 48/767* (2019.02); *B29B 7/58* (2013.01); *B29C 48/395* (2019.02)

(56) References Cited

U.S. PATENT DOCUMENTS

| | | | | |
|---|---|---|---|---|
| 8,360,627 | B2 * | 1/2013 | Stirner | B29B 7/845<br>366/75 |
| 9,688,003 | B2 * | 6/2017 | Stirner | B29C 48/763 |
| 2006/0034962 | A1 * | 2/2006 | Guntherberg | B29B 7/86<br>425/208 |

FOREIGN PATENT DOCUMENTS

| | | | |
|---|---|---|---|
| DE | 202007011767 | U1 | 1/2009 |
| DE | 202012001277 | | 11/2012 |
| DE | 202014001484 | | 4/2014 |
| EP | 1400337 | B1 | 8/2007 |
| EP | 1977877 | A1 | 10/2008 |
| EP | 2218568 | B1 | 1/2012 |

* cited by examiner

EXTRUDER COMPRISING A FILTER ELEMENT

BACKGROUND OF THE INVENTION

This application claims priority from international application number PCT/EP2023/052747, filed Feb. 4, 2023, and European application number 22156128.5, filed Feb. 10, 2022.

BACKGROUND AND SUMMARY OF THE INVENTION

The invention relates to an extruder for processing pulverulent bulk material comprising a filter element according to the preamble of claim 1.

As a general rule, an extruder for producing and processing polymers contains, in its feed region, a housing portion, which accommodates an exchangeable filter element, via which volatile components of bulk material supplied in pulverulent form can be suctioned. Such a filter element is frequently embodied as a porous plate or as a screen. A frequently occurring problem is that such a filter element can easily clog up.

One approach consists of exerting a reverse gas pressure surge on the filter element via a suction channel of the gas-permeable housing portion, from which the volatile components are suctioned in order to free the front side of the filter element, which is directed against the screw shaft(s) of the extruder, from the powder cake deposited there. A further possibility consists of stripping the powder cake mechanically, which, however, is only possible during production breaks.

An extruder which discloses the basic principle of venting the feed region of the extruder is indicated in DE1729395B. A vent which is furnished with a fine mesh screen and which is configured as a sintered metal plate is indicated therein. In order to avoid powder from being sucked out of the vent, the screen is a greater distance from the screw shaft, as a result of which a cushion can be configured, which acts as a very fine mesh filter. The filter property of the cushion depends significantly on the grain size and the properties of the powder material. However, as the cushion increases, the filter performance decreases.

DE3310676A1 mentions a porous plate comprising pore openings of 5-200 μm in the form of a sintered metal plate and a porosity of 25-60% for filtering, in which the plate is a distance from the screw shaft, which corresponds to half the distance of the screw shaft from the inside of the extruder housing.

An extruder, in which a degassing opening is provided, which is furnished with a filter element formed from sintered metal which is located at a distance from the screw shaft, forming a gap having a thickness of 2 mm-30 mm, is indicated in DE202007011767U1 or, respectively EP1977877B1. The filtercake which builds up in the gap can be removed here via a pressure pulse supplied through a pressure purge line.

EP1400337B1 discloses a degassing opening in an extruder, in which a metal-wire-mesh composite sheet having two or more layers is fastened, layers of increasingly narrow mesh being located on a coarsely woven, large-meshed support layer, with the layer of narrowest mesh on the product-related side. The mesh size of the layer of narrowest mesh is 1 μm to 500 μm. The layers of the metal wire mesh composite sheet can be sintered. The composite sheet can be cleaned by backwashing, brushing or burning.

EP2218568B1 discloses an extruder having a degassing opening which accommodates an insert having a filter unit which has a filter fineness of 1 μm to 10 μm and is configured as a metal nonwoven which is supported via a support body and a drainage woven fabric with respect to a base body.

A filter insert for an extruder, in which a protective element which has at least two separate protective regions comprising through-openings is arranged upstream of the filter element, each protective region being assigned a central channel for the supply of gas in order to make possible a separate flushing, is indicated in DE102013208993B4.

DE202012001277U1 discloses an extruder for processing pulverulent bulk material, in which a housing portion, which accommodates a filter element located on a support frame, is configured in the housing of the extruder. The support frame is detachably fastened to the extruder housing. The filter element has a filter layer having a mesh size of <1 μm and contains a rear support layer. The filter element can be removed from the housing portion by means of the support frame.

There is a need to further improve and simplify the filtering device of an extruder.

The object of the invention is to equip an extruder with a filter element which has a reduced mesh width, which is simply constructed and in which regular backwashing of the filter side is not required This object is achieved by the invention indicated in the claims. Advantageous further developments of the invention are disclosed in subclaims.

The invention proceeds from an extruder of the type indicated in the preamble of claim 1.

According to the invention, the filter element formed from interconnected layers of sintered metal wire mesh screens preferably has a mesh size of <1 μm in the filter layer, the filter layer being held between a protective layer facing the screw and a rear support layer. The protective layer is held at a safety distance of 0.5-2 mm from the outer diameter of the screw. The filter element is fastened to a holding device and can therefore be removed from the gas-permeable wall portion.

The filter element used in the case of the invention preferably consists of only three layers, namely a wide-meshed protective layer which prevents damage to the actual filter layer, in particular if this has an extremely small mesh size of less than 1 μm and is correspondingly sensitive. The back of the filter layer is provided with a support layer in order to stabilize the filter unit. The layers and the construction of the filter element of the layers are connected by sintering the layers as well as by interconnecting them.

Since no relevant filtercake is configured in the case of the subject-matter of the invention, the provision of a safety distance merely serves to safeguard against tolerances in the circumference of the screw as well as tolerances in the housing construction of the extruder.

The filter element formed from the indicated layers is self-supporting and dimensionally stable. In order to be able to extract it from the extruder housing for maintenance, it can be removed from the gas-permeable wall portion by releasing the holding device carrying the filter element.

The radial position of the holding device in the extruder housing with respect to the screw is preferably configured to be adjustable. In particular, the adjustability can be realized in that the holding device can be adjusted by means of an adjustable screw connection between the holding device and a cover plate which is detachably fastened to the extruder housing.

The filter element is preferably screwed or clamped onto the holding device by means of fastening strips. The fastening strips serve to locate the filter element such that it is fixed in place and to compress a seal between the filter element and the holding device to avoid warping and displacement of the filter element due to high shear forces during the operation of the extruder. The fastening strips also make it possible to separate the filter element from the holding device simply. A self-supporting clamping frame which accommodates the filter element can also be provided without screw fastening, as an alternative to fastening strips or clamping strips.

The gases flowing through the filter layer are preferably suctioned via a bore in the screw connection, to which a suction channel can be flanged via a coupling. The bore of the screw connection leads into a hollow space in the holding device on the back of the filter layer.

In order to prevent gases from escaping through gaps between the holding device and the cover plate of the gas-permeable housing portion in the extruder housing, the holding device preferably has a circumferential seal. Flat seals extending up to the circumferential housing portion can also be provided between the holding device and the filter layer in order to produce a gas-tight seal there as well.

DESCRIPTION OF THE DRAWINGS

The invention is explained in greater detail below with reference to an exemplary embodiment, wherein.

DESCRIPTION OF PREFERRED EMBODIMENTS

Figure 1:
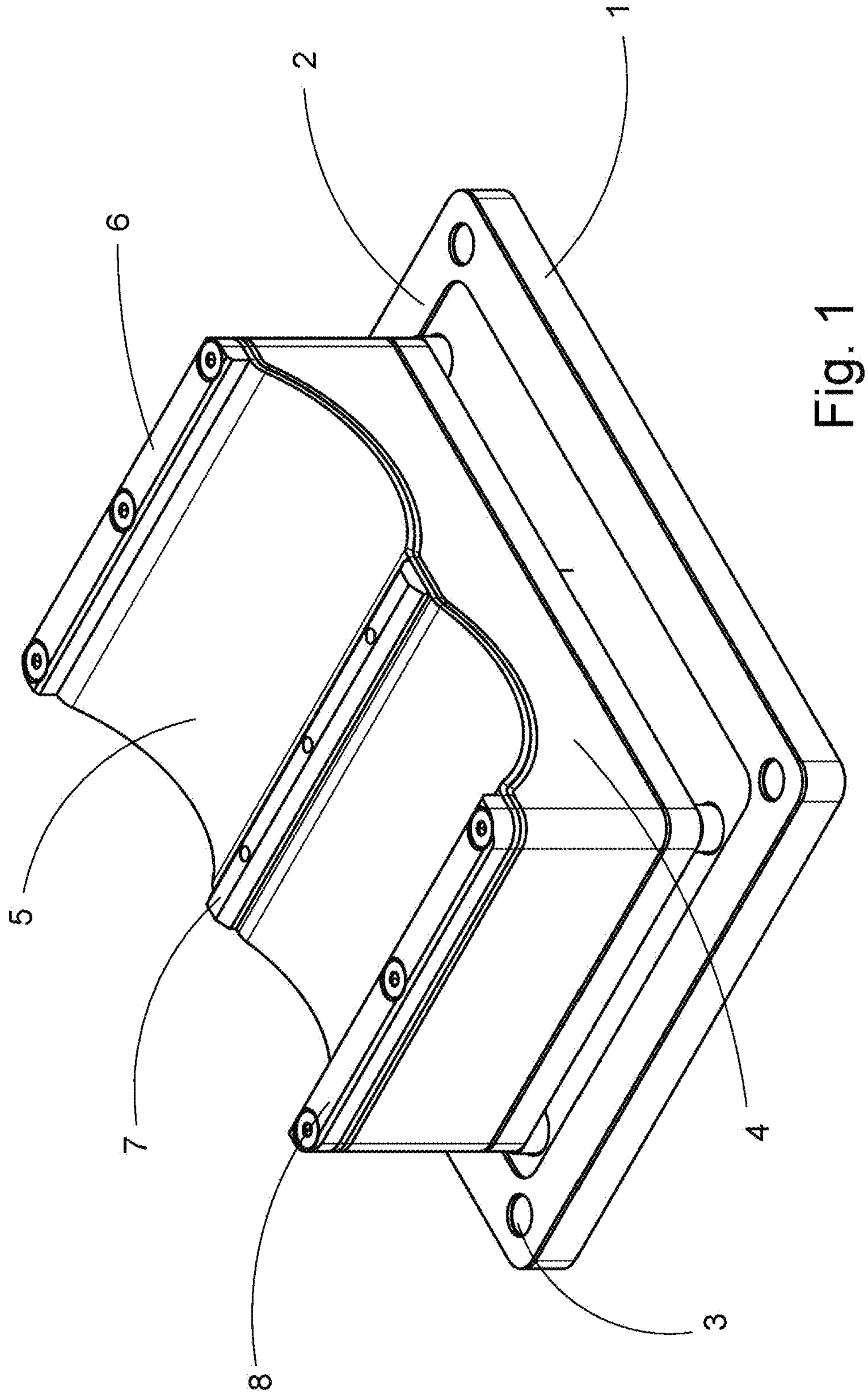
FIG. 1 shows a simplified perspective view of an insert part for accommodating a filter element.

A substantially cuboidal insert element shown in FIG. 1 is configured so that it can be inserted into a housing portion of the feed region of an extruder. It has a cover plate 1 furnished with a gas passage, which cover plate can either be fastened onto an edge portion of the gas-permeable wall portion of the extruder housing by means of a screw connection via boreholes 3 on the corner side, or which rests on a recessed shoulder in the wall region of the wall portion and is fastened thereto by means of screws, as a result of which the surface of the cover plate can run in the plane of the outside of the extruder housing.

A flat seal 2 for sealing the cover plate 1 against the extruder housing is located between the cover plate 1 and the extruder housing.

Figure 2:
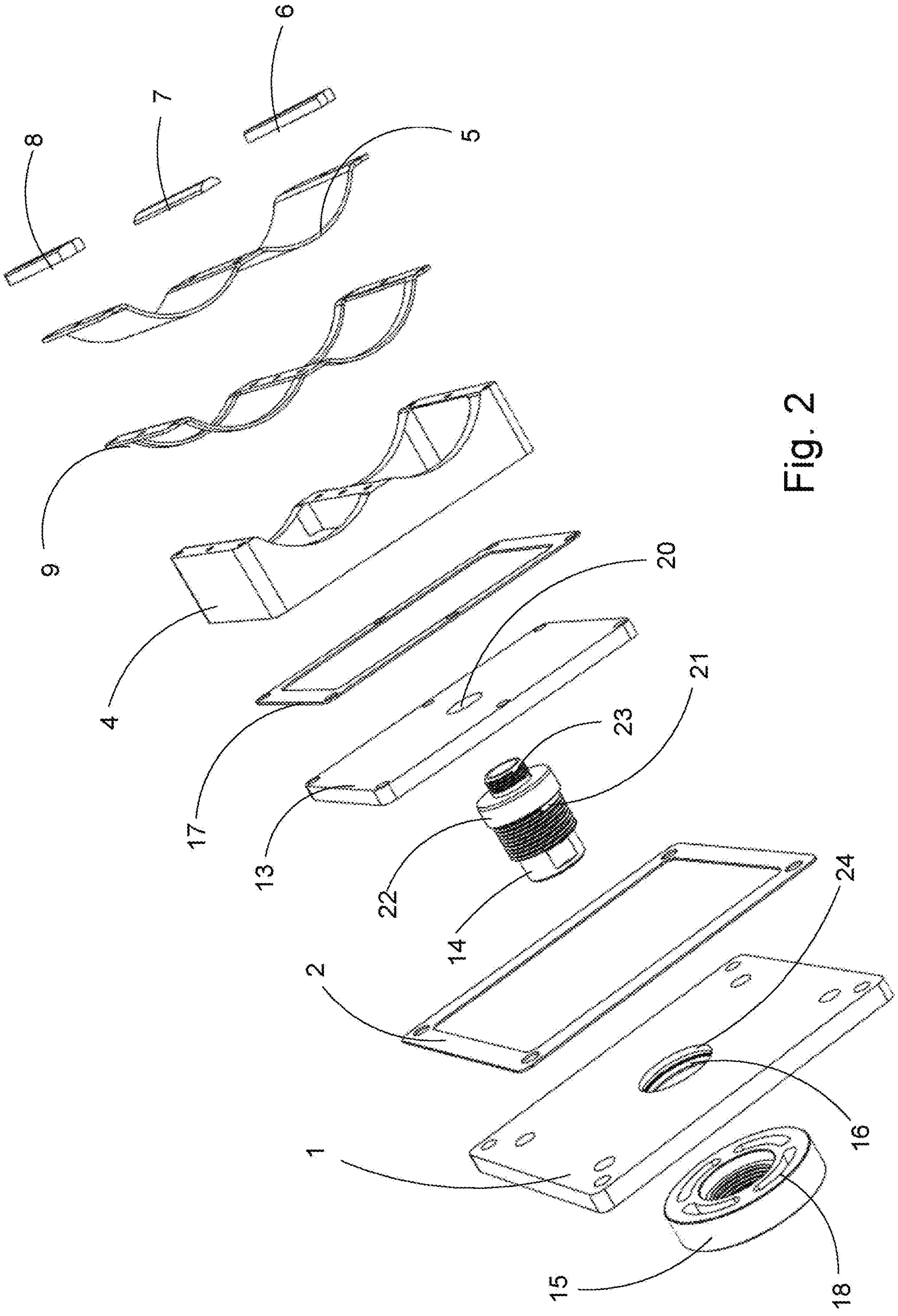
FIG. 2 shows an exploded drawing of the insert part.
Figure 3:
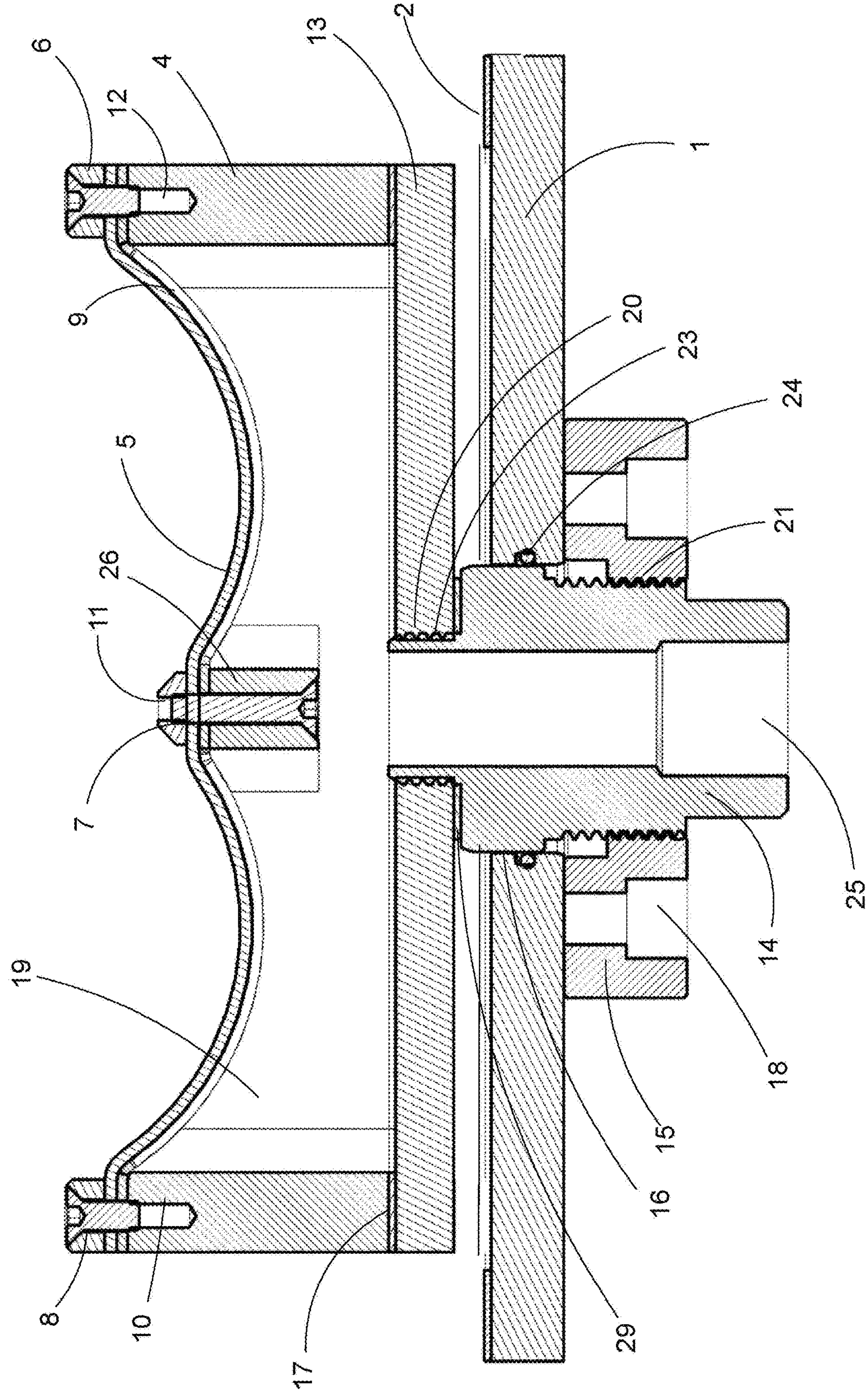
FIG. 3 shows a cross-sectional view of the insert part.

A screw connection 14 depicted in detail in FIGS. 2 and 3 connects the cover plate 1 to a support frame 4 via a filter cover 13. The support frame 4 has double-bend side walls on the front side for a twin-screw extruder, the arcuate shape of which side walls represents partial arcs which run concentrically to the circumference of two screws located in a double extruder. The front side of the filter element 5 directed against the screws rests in the radial direction of the screws via a seal 9 at the edge of the arc-shaped side walls and in the axial direction of the screws on straight edge portions of the support frame 4 and is fastened to the support frame 4 by means of clamping strips 6, 7, 8.

When the filter element is fixed to the screws, the filter construction lies snugly in contact with the circumference of the screws.

FIG. 2 shows an exploded view of the insert element for insertion into an extruder housing. The cover plate 1 has a central bore 16 in which there is an annular seal 24 which is directed against a smooth-cylindrical region 22 of the screw connection 14 which is guided through the bore 16. The front end of the screw connection 14 carries an external thread 23, via which the screw connection 14 can be screwed into an internal thread 20 of a plate-shaped filter cover 13 which forms the rear part of the support frame 4.

The enlarged shoulder 22 adjoins the thread 23 of the screw connection 14, on which the cover plate 1 placed thereon can be displaced in the axial direction. A flat seal 29 is located on the front side of the shoulder 22. An external thread 21 is configured in the axially central region of the screw connection 14. As soon as the screw connection is fastened to the filter cover 13 via the thread 23 and the cover plate 1 having the bore 16 is pushed onto the enlarged shoulder 22, a lock nut 15 can be screwed onto the thread 21, which makes it possible to position the support frame 4 in relation to the cover plate 1 as a function of the axial position of the lock nut on the thread 21.

The axial position of the screw connection 14 and therefore the position of the filter unit, which comprises the filter cover, the support frame and the filter element, can be locked with respect to the cover plate 1 in relation to the screws. This can be achieved in that the lock nut 15 can be fixed with respect to the cover plate 1 via clamping screws which are guided through the lock nut 15 through slots 18 running in the circumferential direction of the lock nut 15 and are screwed into the cover plate 1. If the clamping screws are loosened again, the lock nut can be twisted and therefore the position of the entire filter unit can be changed with regard to the cover plate 1.

Guide pins fastened to the cover plate 1 or the support frame 4, which are inserted into blind holes of the opposite support frame 4 or, respectively the cover plate 1, can be used to prevent the support frame 4 from twisting with respect to the cover plate 1.

The screw connection 14 is configured as a hollow screw having a bore 25. A quick-release coupling of a gas discharge channel or hose can be flanged to the bore 25 on the outside of the screw connection.

The front, open end of the screw connection 14 protrudes into the internal space 19 of the support frame 4, so that a gas-conducting channel into the internal space 19 of the support frame is formed via the screw connection 14.

The annular seal 24 and the flat seals 2 and 17 serve to seal the internal space of the filter element with respect to the ambient air of the extruder.

The flat seal 17 is located between the filter cover 13 and the support frame 4. The support frame is formed from two longitudinal walls and two transverse walls, the transverse walls having double-bend surfaces on the front side for a twin-shaft extruder and single-bend surfaces on the front side for a single-shaft extruder, while the longitudinal walls are substantially rectangular with planar surfaces on the front side.

The filter element, which has a shape corresponding to the circumferential surfaces, is applied to the circumferential surfaces of the support frame 4. It is fastened to the surfaces with the aid of screws, which are guided through the longitudinally running clamping strips 6, 7, 8 into blind holes 10, 11, 12 of the side walls or, respectively a central web 26. A flat seal 9 following the shape of the filter element 5 is provided between the filter element 5 and the surfaces on the front side of the support frame 4 in order to provide a seal between the filter element 5 and the support frame 4.

The hollow space 19 between the back of the filter element 5, the insides of the support frame 4 and the filter cover 13 is directly connected to a suction channel via the bore 25 in the screw connection 14, so that gases entering the hollow space 19 can be suctioned without any problems via the filter element 5.

The filter element is self-supporting and rigid. It substantially contains three layers, namely a front protective layer 27, a filter layer 28 and a rear support layer. All three layers are configured as sintered metal screen layers, with the filter layer 28 having a mesh size of <1 μm, preferably 0.5 μm. The protective layer 27 has a mesh size of approximately 20-100 times that of the filter layer 28, while the support layer preferably likewise has a mesh size of 20-100 μm. To increase the rigidity, the support layer can also be formed from multiple layers sintered together having different mesh sizes.

Figure 4:
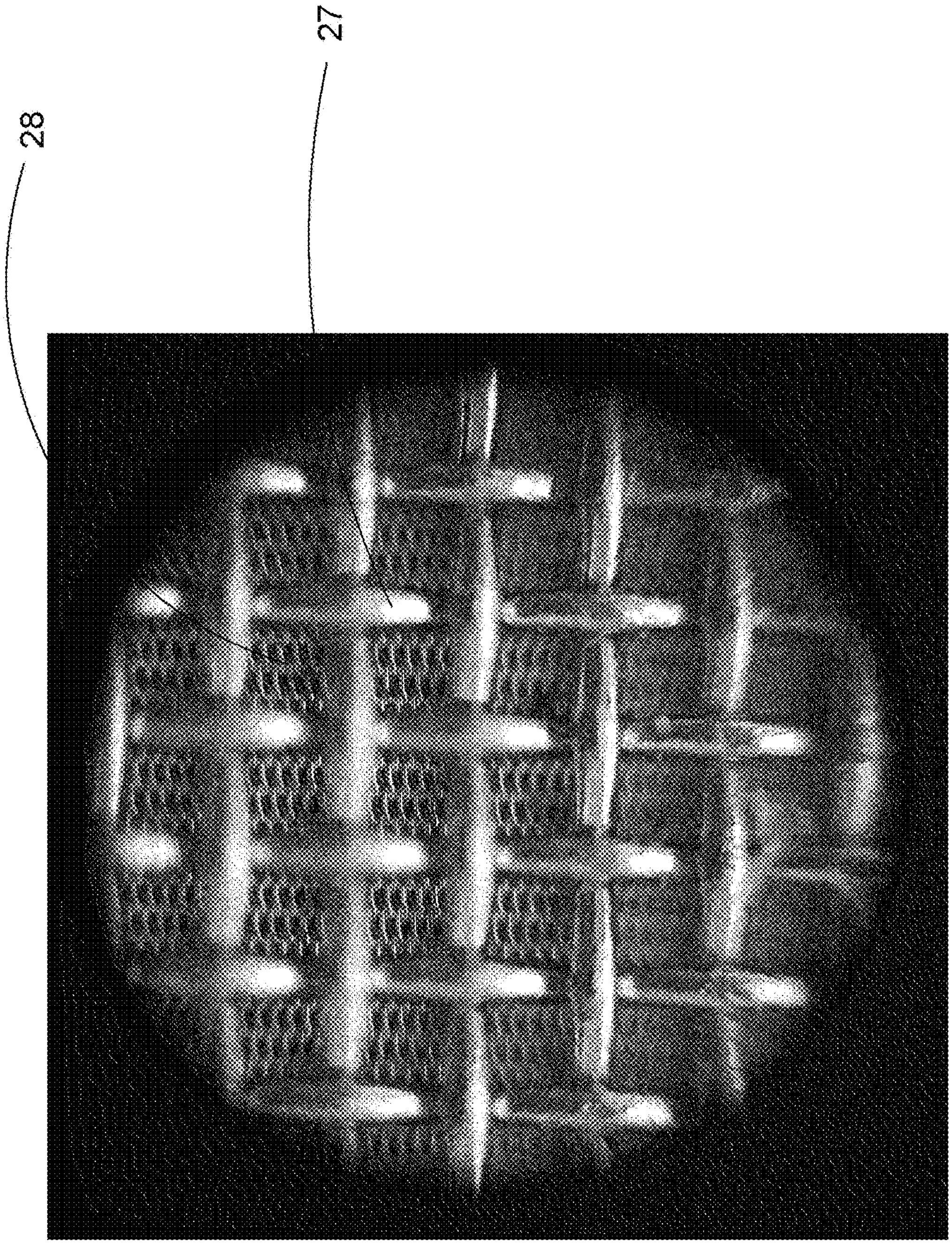
FIG. 4 shows a microscopic view of the filter layer, viewed from the screw(s).

FIG. 4 shows a microscopic photograph of the filter element, which shows the protective layer 27 and the filter layer 28 lying underneath. The thickness of the protective layer 27 is so small that the filter layer 28 can be located at a distance of 0.5-2 mm from the course of the outer circumference of the screws. This ensures that no filtercake can be configured in practice between the filter layer and the outer circumference of the screws. Consequently, neither a pressure pulse through the filter layer to break down a filtercake nor brushing is required. This increases the service life of the extruder and avoids downtimes.

A precise distance adjustment of the filter layer 28 with respect to the circumference of the screws can be achieved by suitably adjusting the screw connection 14.

The invention is not limited to deployment on twin-screw extruders, but can also be used with an adapted shape in the same way in the case of single-screw extruders.

REFERENCE NUMERALS

1 Cover plate
2 Flat seal
3 Bore
4 Support frame
5 Filter element
6 Clamping strip
7 Clamping strip
8 Clamping strip
9 Flat seal
10 Bore
11 Bore
12 Bore
13 Filter cover
14 Screw connection
15 Lock nut
16 Bore
17 Flat seal
18 Slot
19 Hollow space
20 Internal thread
21 External thread
22 Shoulder
23 Thread
24 Annular seal
25 Bore
26 Central web
27 Protective layer
28 Filter layer
29 Flat seal

We claim:

1. An extruder for processing pulverulent bulk material, comprising an extruder housing which has at least one axially directed bore with an inner wall and an extruder screw accommodated in the at least one bore, and at least one housing portion configured in a feed region of the extruder housing, the at least one housing portion accommodating a filter element (5) located on a support frame (4), the filter element (5) being configured for suctioning gaseous constituents of the bulk material, and the support frame (4) being detachably fastened to the extruder housing, characterized in that:

the filter element (5) is formed from interconnected layers of sintered metal wire mesh screens, the interconnected layers comprise at least one protective layer (27) facing the screw and having a mesh size of 20-100 μm, a filter layer (28) having a mesh size of <1 μm, and a rear support layer, the at least one protective layer (27) being located at a safety distance of 0.5-2 mm from the outer diameter of the screw, and the filter element (5) can be removed from the at least one housing portion by means of the support frame (4), the filter element (5) being self-supporting and dimensionally stable, and the filter element (5) being fastened to the support frame (4) via a circumferential seal (9).

2. The extruder according to claim 1, characterized in that the position of the support frame (4) in the extruder housing can be adjusted radially to the at least one bore of the extruder.

3. The extruder according to claim 2, characterized in that the support frame (4) can be adjusted radially by means of an adjustable screw connection (14) between the support frame (4) and a cover plate (1) detachably fastened to the extruder housing in the radial direction of the extruder screw or the at least one bore.

4. The extruder according to claim 3, characterized in that the screw connection (14) has a bore (25) running in the axial direction of the screw connection for connecting a suction channel thereto.

5. The extruder according to claim 1, characterized in that the filter element (5) is fastened to the support frame (4) by means of clamping strips (6, 7, 8) running in the axial direction of the extruder or a clamping frame.

* * * * *